US010256901B2

(12) United States Patent
Jiang et al.

(10) Patent No.: US 10,256,901 B2
(45) Date of Patent: Apr. 9, 2019

(54) SYSTEMS AND METHODS FOR OPTICAL SIGNAL-TO-NOISE RATIO MONITORING

(71) Applicant: HUAWEI TECHNOLOGIES CO., LTD., Shenzhen (CN)

(72) Inventors: Zhiping Jiang, On (CA); Xuefeng Tang, On (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/665,351

(22) Filed: Jul. 31, 2017

(65) Prior Publication Data

US 2019/0036600 A1 Jan. 31, 2019

(51) Int. Cl.
H04B 17/00 (2015.01)
H04B 10/079 (2013.01)

(52) U.S. Cl.
CPC .............. H04B 10/07953 (2013.01)

(58) Field of Classification Search
CPC ........ H04B 2210/075; H04B 10/07955; H04B 10/6165; H04B 10/0775; H04B 10/07953; H04J 14/06; H04J 14/0221; H04J 14/0227; H04J 14/0276
USPC .......................................... 398/26
See application file for complete search history.

(56) References Cited

U.S. PATENT DOCUMENTS

| 5,818,629 | A | * | 10/1998 | Kinoshita | ............ | G01J 9/00 |
| | | | | | | 359/337.11 |
| 6,599,039 | B1 | * | 7/2003 | Nakazato | ............ | H04B 10/077 |
| | | | | | | 398/25 |
| 2004/0213566 | A1 | * | 10/2004 | Takanashi | .......... | H04B 10/0775 |
| | | | | | | 398/32 |
| 2014/0376909 | A1 | * | 12/2014 | Frisken | ............... | H04J 14/0227 |
| | | | | | | 398/26 |
| 2018/0069626 | A1 | * | 3/2018 | Zhao | ................ | H04B 10/07955 |

FOREIGN PATENT DOCUMENTS

| CN | 102594447 A | 7/2012 |
| CN | 102742185 A | 10/2012 |
| CN | 104052544 A | 9/2014 |
| CN | 104753591 A | 7/2015 |
| EP | 2264916 A1 | 12/2010 |

OTHER PUBLICATIONS

State Intellectual Property Office of the P.R. China (ISA/CN), International Search Report and Written Opinion for PCT/CN2018/097688 dated Oct. 18, 2018 (10 pages).

* cited by examiner

Primary Examiner — Don N Vo
(74) Attorney, Agent, or Firm — Trop, Pruner & Hu, P.C.

(57) ABSTRACT

A system for monitoring optical signal-to-noise ratio (OSNR) is provided. In some specific examples, the system may use a pilot tone power of a signal modulated with pilot tone to derive the pure signal power and the variance of the whole electric field to derive the total power (pure signal power plus amplified spontaneous emission (ASE) power of the signal). The ASE power can be obtained by subtracting the pure signal power from the total power (ASE+pure signal). Once the ASE power and the pure signal power are known, the OSNR can be calculated.

20 Claims, 11 Drawing Sheets

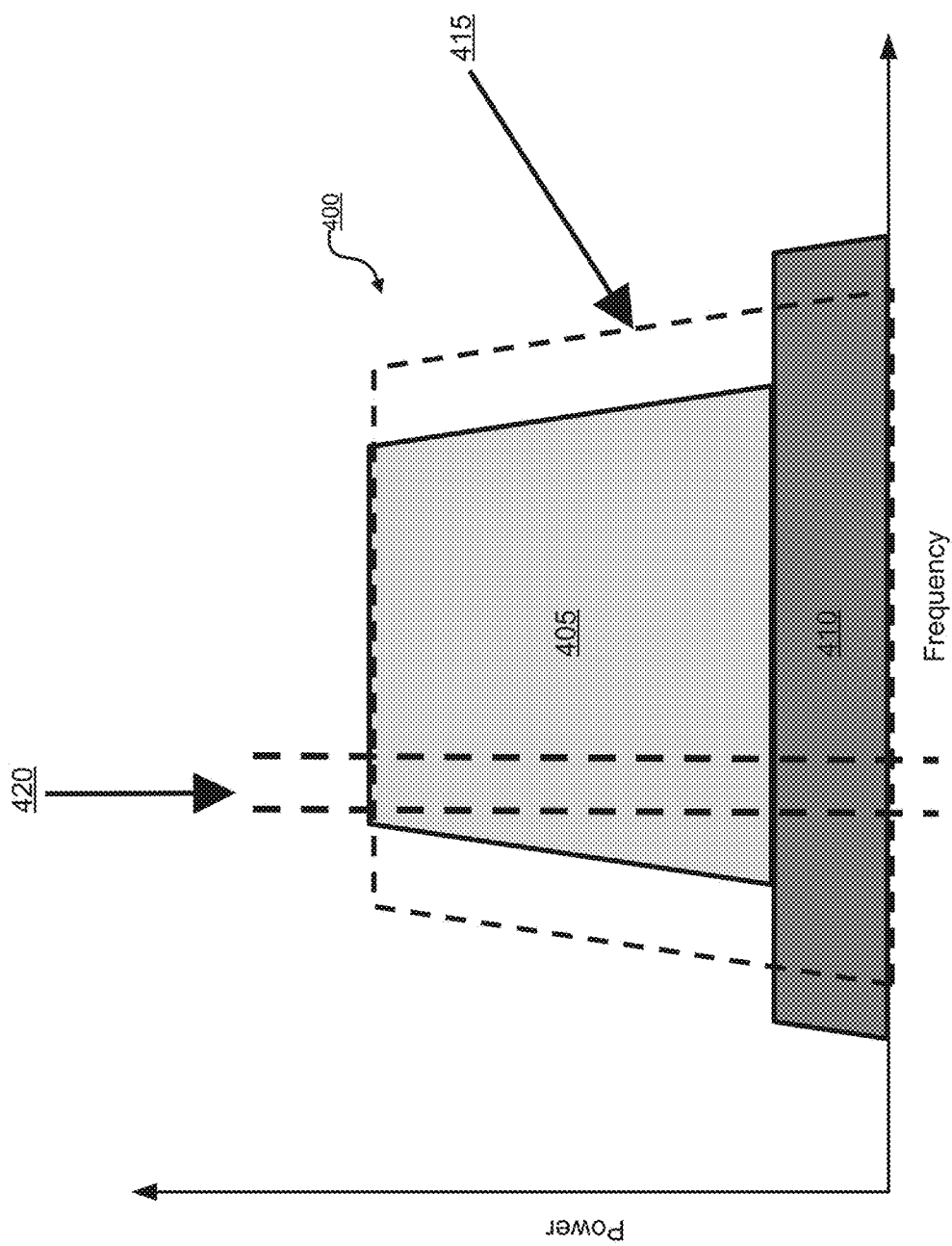

SYSTEMS AND METHODS FOR OPTICAL SIGNAL-TO-NOISE RATIO MONITORING

TECHNICAL FIELD

The present disclosure relates generally to optical communication technologies, and in particular, to systems and methods for optical signal-to-noise ratio monitoring in an optical communication system.

BACKGROUND OF THE INVENTION

Optical amplifiers may be used in optical networks to compensate for various losses, such as fiber loss and other component losses. Optical signal-to-noise ratio (OSNR) may be degraded due to these amplifications. In optical communication systems, OSNR is a key signal quality parameter for measuring performance of an optical signal. OSNR may be defined as a ratio of power of an optical signal not including amplified spontaneous emission (ASE) noise, to the power of ASE noise in a bandwidth of 0.1 nanometers. Established OSNR monitoring systems may have many drawbacks, including having high costs, being inaccurate, being difficult to use, and being intrusive.

BRIEF SUMMARY OF THE INVENTION

In various embodiments, a system for monitoring optical signal-to-noise ratio (OSNR) is provided. The system may use pilot tone and coherent digital signal processing (DSP) technologies to provide a low-cost, accurate, fast and online OSNR monitoring scheme. The OSNR monitoring system and method according to various embodiments of the present disclosure may be more accurate and/or faster than conventional OSNR monitoring methods. Further, the OSNR monitoring system and method according to the various embodiments of the present disclosure may be able to perform OSNR monitoring in an online manner (i.e., with no interruption to normal operation). In some specific examples, the system may use a pilot tone power of a signal modulated with pilot tone to derive the pure signal power and the variance of the whole electric field to derive the total power (pure signal power plus amplified spontaneous emission (ASE) power of the signal). The ASE power can be obtained by subtracting the pure signal power from the total power (ASE+pure signal). Once the ASE power and the pure signal power are known, the OSNR can be calculated.

According to one aspect, a method for monitoring OSNR in an optical communication network is provided. The method comprises receiving a signal at the optical communication network. The signal may be modulated with pilot tone. The method further comprises measuring a total power of the signal. The total power of the signal includes a pure signal power and an ASE power. The method further comprises calculating a variance value of the signal electric field. The method further comprises detecting a pilot tone power of the signal to derive the pure signal power. The method further comprises calculating the ASE power using the variance value of the signal electrical field and the pure signal power. The method further comprises calculating the OSNR by dividing the total power by the ASE power.

Optionally, in any of the preceding aspects, the signal may have single polarization or dual polarization.

Optionally, in any of the preceding aspects, the signal may be received at a coherent receiver of the optical communication network.

Optionally, in any of the preceding aspects, before the signal is received, the signal may be mixed with a local oscillator (LO) signal, an analog signal may be generated from the mixed signal using a photodiode, the analog signal may be amplified, and the analog signal may be converted into a digital signal.

Optionally, in any of the preceding aspects, accumulated chromatic dispersion may be reduced or removed from the signal.

Optionally, in any of the preceding aspects, the signal may be filtered by a filter having a particular bandwidth.

Optionally, in any of the preceding aspects, the signal may be filtered to detect a signal-to-ASE noise ratio at the bandwidth.

Optionally, in any of the preceding aspects, if the signal is filtered, the variance value may be calculated within the bandwidth of the filter.

Optionally, in any of the preceding aspects, the variance value may be calculated over a portion of the frequency spectrum of the signal.

According to one aspect, a system for monitoring OSNR in an optical communication network is provided. The system comprises a processor. The system further comprises a memory coupled to the processor, the memory storing instructions, which when executed by the processor, cause the system to perform operations including the steps of the methods described herein. In some embodiments, these steps may be performed by functional units or modules.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

FIG. 4B illustrates a schematic diagram of a spectra of an optical signal measured across a portion of the spectrum in accordance with the disclosure.

DETAILED DESCRIPTION OF THE INVENTION

Figure 1:
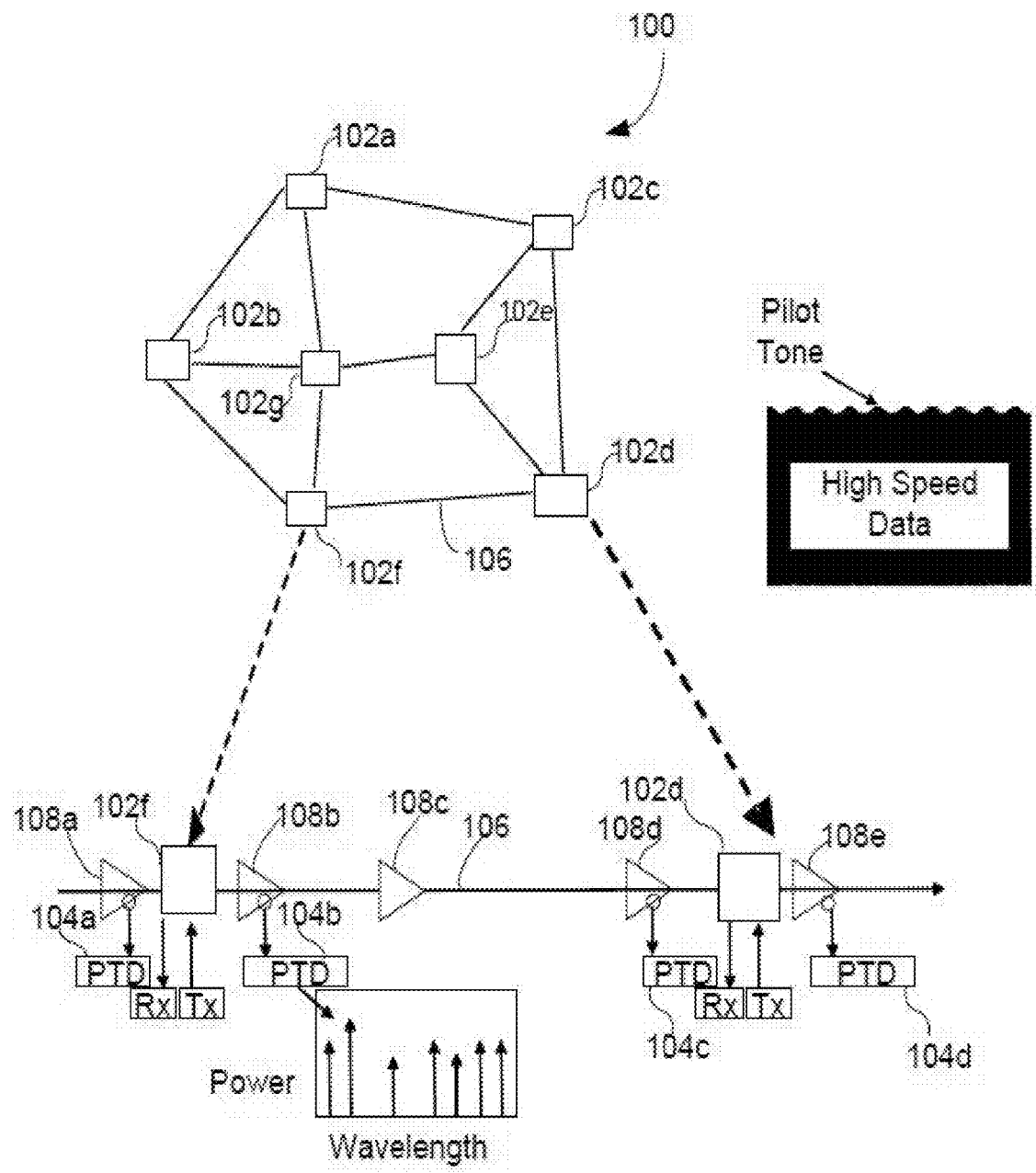
FIG. 1 illustrates a block diagram of an optical communication network in accordance with the disclosure.

An optical communication network connects computers (or any other device which can generate or store data in electronic form) using optical fibers. To facilitate data communication, an optical network can include optical devices to generate optical signals from electrical signal data (and alternately generate electrical signals from optical signal data), to restore optical signals after it propagates through fibers, and to route optical signals through the network.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

FIG. 1 illustrates an exemplary optical communication network 100 in accordance with the disclosure. As shown, optical communication network 100 can have a plurality of nodes 102, such as nodes 102a-g illustrated in FIG. 1. In an optical network, devices known as OADMs (optical add-drop multiplexers) are typically referred to as nodes where channels can be added/dropped. An individual node 102, such as node 102f and node 102d, may include a reconfigurable optical add-drop multiplexer (ROADM) for multiplexing many different wavelength signals onto a fiber link (e.g., link 106) that connects the individual nodes 102. The ROADM is a type of OADM that is typically used in a dense wavelength division multiplexing (DWDM) system.

FIG. 1 illustrates, for example, details of the fiber link 106 between nodes 102f and 102d are illustrated. As shown, the fiber link 106 can include optical amplifier 108, such as Erbium-doped fiber Amplifiers (EDFA) 108a-e, a plurality of pilot tone detectors (PTDs) 104, such as 104a-f shown in this example, and/or any other components.

The PTDs 104 can be placed at various locations on the fiber links in the optical communication network 100 for monitoring channel information, such as wavelength, power, modulation format, baud rate, and/or other performance characteristics. An individual PTD, such as PTD 104a can include a low-speed photodiode, an electric amplifier, an analog-to-digital converter, and a digital signal processor (DSP). As shown, a receiver (Rx) may be configured to communicate with a transmitter (Tx) through nodes 102d and 102f in the optical network 100. At an individual node 102, such as node 102d, there may be one or more transmitters and/or one or more receivers connecting to the individual node 102. It should be understood the example shown in FIG. 1 only shows one Tx/Rx connecting to an individual node 102 only for the sake of simple illustration. A pilot tone can be applied to every wavelength at a given Tx. In this example, the high speed data signal is modulated at low frequency.

For the different wavelengths in a fiber link, for example fiber link 106 as shown, different pilot tones can be applied to different wavelengths. For example, the pilot tones can be in different frequencies. That is, a certain relatively low frequency (pilot tone) can be added to the data signal transmitted through a particular channel in the fiber link 106, and a pilot tone detector can be used for detecting such a frequency. Information regarding the channel can be carried by the pilot tone, such as channel wavelength, baud rate, modulation format, etc.

Optical amplifiers (e.g., EDFAs 108*a-f*) may be used in the optical communication network 100 to compensate for various losses, such as fiber loss and other component losses. However, amplifiers are inherently noisy devices and may degrade the optical signal-to-noise ratio (OSNR). In optical communication systems, OSNR is a key signal quality parameter for measuring performance of an optical signal. Conventional OSNR monitoring systems may have many drawbacks, including having high costs, being inaccurate, being difficult to use, and being intrusive.

One example of a conventional OSNR monitoring system is defined by ITU-T G.697 and uses out-of-band noise monitoring. According to ITU-T G.697, optical spectrum analysis needs to be performed on an acquired to-be-tested signal. In a low-speed optical communication network, differences between the power of the noise in the channel and the powers of the inter-channel noise are not very great. Thus, a linear interpolant of the powers of the inter-channel noise may be equivalent to the power of the noise in the channel. In this conventional OSNR monitoring of a low-speed optical communication network, the peak power at the center wavelength of the to-be-tested channel minus the linear interpolant may be equivalent to the power of the optical signal not including noise in the channel. Therefore, in this conventional low-speed application, the OSNR of the signal of the to-be-tested channel may be calculated using relatively simple signal and noise measurements.

However, in a high-speed optical communication network, the distance between channels is relatively small, and optical spectra overlap. Thus, differences between a real power of noise in a channel and powers of inter-channel noise are relatively great. If the power of the noise in the channel is obtained by measuring the powers of the inter-channel noise, there is a relatively large difference between the calculated OSNR and the real OSNR. In other words, the OSNR calculation may not be accurate for a high-speed optical communication network when the OSNR is calculated according to conventional low-speed network methods.

Moreover, out-of-band OSNR monitoring systems may also be inaccurate due to the function of the reconfigurable optical add/drop multiplexer (ROADM) in an optical communication network. The ROADM may, in regular operation, filter out inter-channel amplified spontaneous emission (ASE), which is the noise introduced by the amplifier. Thus, an out-of-band OSNR measurement may not reflect the actual ASE noise power in the channel. In addition, the bandwidth of the optical signal may almost be as large as the channel filter bandwidth. This may result in smooth transitions between the noise and the signal, which may lead to inaccurate OSNR measurements due to the need to have clear separations between the carrier signals.

In-band techniques for OSNR measurements are known as well. One example of a conventional in-band OSNR monitoring system is known as "polarization splitting". An optical signal may include a pure signal component and an ASE component. This in-band measurement method requires that the transmitted optical signal be highly polarized and that the ASE signal be unpolarized. This in-band measurement also requires that the optical signal contain only one polarization and that there be a large separation between the optical signal and the ASE signal. A polarization controller and a polarization splitter may be used. The polarization controller may be used to adjust the polarization of the signal so that all of its power will exit the polarization splitter at one port. Because the ASE signal is unpolarized, approximately half of the ASE noise may exit at one port, while the remaining half may exit at the other port. However, some devices may contain multiple signals, each of which possess a different state of polarization. As a result, this in-band measurement technique may be time consuming. In addition, for modern coherent optical signals, polarization multiplexed signals may be used. Thus, this polarization nulling method may not be suitable for measuring OSNR.

Still other techniques have been proposed to enable OSNR measurement for dual-polarization optical signals. For example, one exemplary OSNR measurement system uses an optical tunable filter to select a spectral slice with a signal-to-ASE ratio. The pure signal power is measured by pilot tone detection, and the total signal power (i.e., pure signal power and ASE power) is measured by photocurrent. However, this technique has very high error at high OSNR, requires an expensive optical tunable filter, does not work with a Nyquist signal (due to sharp roll-off), and has large error if the signal is altered by a link optical filter, such as a wavelength selective switch (WSS).

Embodiments of the disclosure provide systems and methods that use pilot tone and coherent digital signal processing (DSP) technologies to provide a low-cost OSNR monitoring scheme. The OSNR monitoring system and method according to the various embodiments of the present disclosure may be more accurate and/or faster than conventional OSNR monitoring methods. Furthermore, the OSNR monitoring system and method according to the various embodiments of the present disclosure may be able to perform OSNR monitoring in an online manner (i.e., in a manner that does not disrupt normal operation). OSNR is defined as the total signal power over the ASE power in a 0.1 nanometer bandwidth. Thus, in order to calculate OSNR, the total power of the optical signal and the ASE power must be determined.

Figure 2:
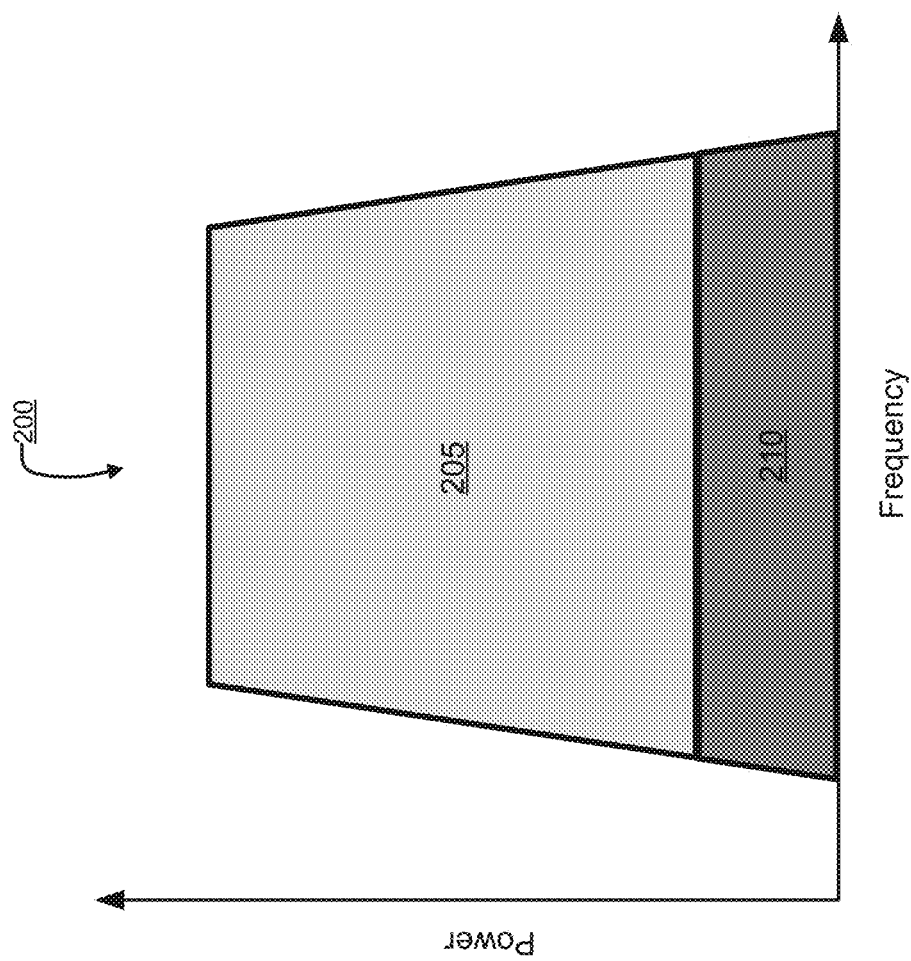
FIG. 2 illustrates a schematic diagram of a spectra of an optical signal in accordance with the disclosure.

FIG. 2 illustrates a schematic diagram of a spectra of an optical signal 200 in accordance with the disclosure. The optical signal 200 may be modulated with pilot tone with accurate modulation depth. The optical signal 200 may include a signal component 205 and an amplified spontaneous emission (ASE) component 210. Assuming a complex optical electrical field for the signal component 205, $E(t)$, and for the ASE component 210, $E_{ASE}(t)$, the electrical field of the optical signal 200 may be the sum of these two components:

$$E_S(t)+E_{ASE}(t) \quad \text{(Equation 1)}$$

The total power of the optical signal 200 may be derived by calculating the variance value of electrical field of the optical signal 200:

$$|E_S(t)+E_{ASE}(t)|^2=|E_S(t)|^2+|E_{ASE}(t)|^2 \quad \text{(Equation 2)}$$

The total signal power may be proportionate to the variance value of the electrical field.

Because the optical signal 200 is modulated with pilot tone, then the pure signal power (i.e., the power of the signal component 205 without the power of the ASE component 210) can be derived by detecting the pilot tone power, e.g., using a PTD 104*a-d* of FIG. 1. The pilot tone power may be proportionate to the pure signal power according to a ratio.

Once the pure signal power and the total power of the optical signal 200 are known, the ASE power (i.e., the power of the ASE component 210) may be calculated using Equation 1. Once the ASE power is known, OSNR can be calculated with proper bandwidth scaling according to the definition of OSNR:

$$OSNR = \frac{\text{Total signal power}}{\text{ASE power in 0.1 nm}} \qquad \text{(Equation 3)}$$

OSNR is calculated with a 0.1 nanometer bandwidth as industry standard. Thus, if the signal power is measured within a smaller bandwidth than the entire signal spectrum, then the signal power may be scaled to the entire signal power using the spectral shape, which may be known through calibration.

The OSNR monitoring described with respect to FIG. 2 can be done anywhere in the optical communication network (i.e., the power of the optical signal 200 and the pilot tone power can be measured anywhere in the network). In some embodiments, however, the OSNR monitoring may be implemented in a coherent receiver. The coherent receiver may have the hardware to implement the OSNR monitoring described with respect to FIG. 2.

Figure 3:
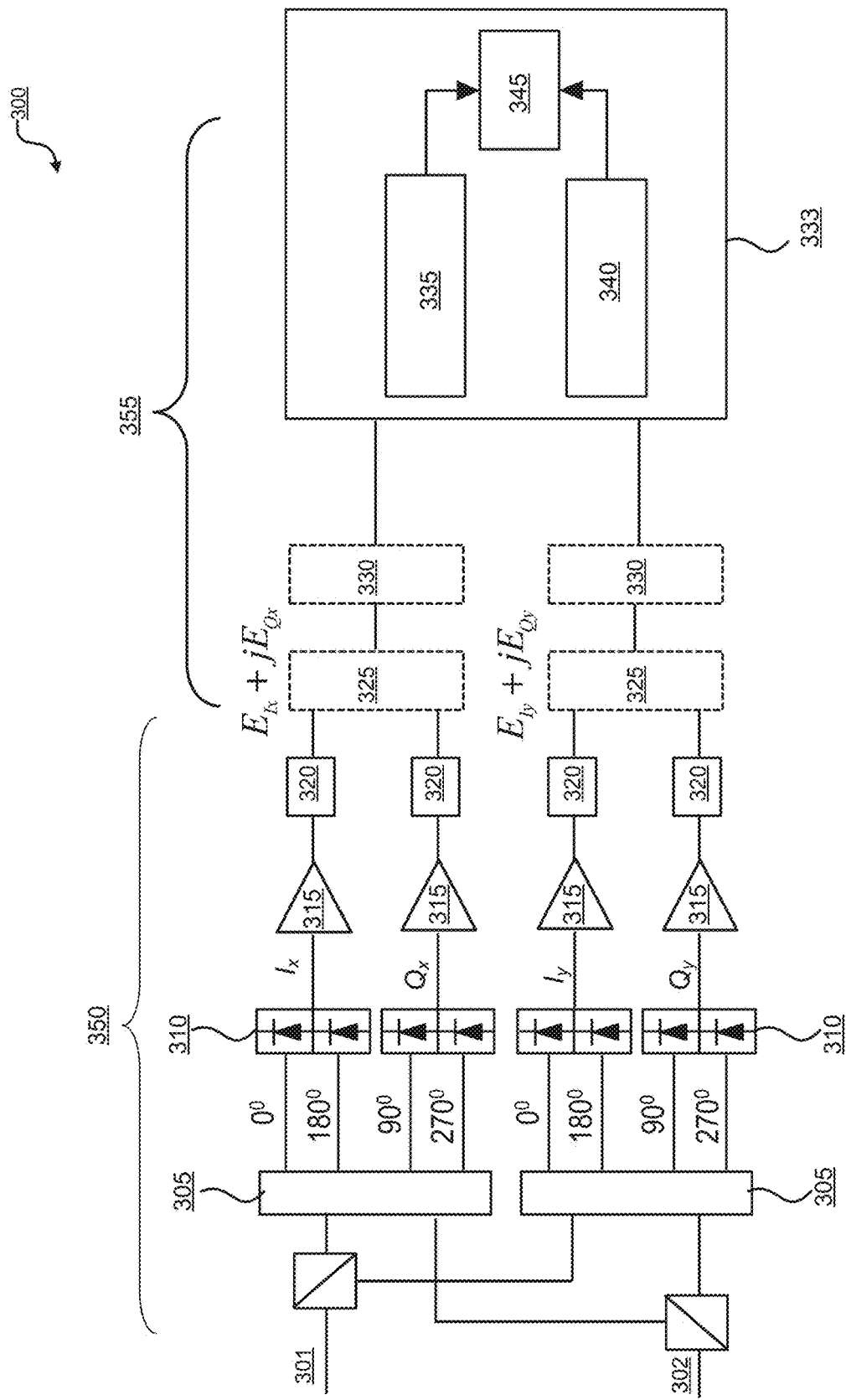
FIG. 3 illustrates a schematic diagram of a system for optical signal-to-noise ratio monitoring at a coherent receiver in accordance with the disclosure.

FIG. 3 illustrates a schematic diagram of a system 300 for optical signal-to-noise ratio monitoring at a coherent receiver in accordance with the disclosure. The system 300 includes a coherent receiver portion 350 and an OSNR digital signal processing (DSP) portion 355. Although omitted from FIG. 3 for the sake of simplicity, it is contemplated that coherent receiver portion 350 may further include DSP components.

An optical signal 301 may be received at the coherent receiver portion 350. The optical signal 301 may be modulated with pilot tone. The optical signal 301 may be mixed with a local oscillator (LO) signal 302 in 90° optical hybrids 305, and detected by balanced photodiodes 310 to generate four analog electrical signals: $I_x$, $Q_x$, $I_y$, and $Q_y$. In a typical dual polarization coherent signal, there are two polarizations (x, y), and in each polarization, there are two orthogonal phases (in-phase (I) and quadrature phase (Q)). The four analog electrical signals may be amplified by power amplifiers 315. Power amplifiers 315 may include, for example, transimpedance amplifiers (TIAs). The amplified analog signals may be converted into digital signals by analog-to-digital converters (ADCs) 320.

In the OSNR DSP portion 355, the digital signals may optionally be received at chromatic dispersion compensation ($CD^{-1}$) blocks 325. $CD^{-1}$ blocks 325 remove or reduce accumulated chromatic dispersion. It is generally desirable to remove or reduce chromatic dispersion in a coherent receiver in order to remove or reduce dispersion fading. The digital signals may optionally be received at filters 330. Filters 330 apply frequency domain filtering to obtain the OSNR at a given frequency band.

OSNR may be calculated for the digital signals at a processor 333 applying any of the methods described herein. Specifically, variance calculation engine 335 may be configured to detect the total power of the digital signals and calculate the variance of the digital signals. Pilot tone detection engine 340 may be configured to detect the pilot tone power of the signals in order to derive the pure signal power. The OSNR calculation engine 345 may be configured to calculate the ASE power using the total power and the pure signal power. The OSNR calculation engine 345 may further be configured to calculate the OSNR using the total power of the digital signals and the ASE power.

Figure 4A:
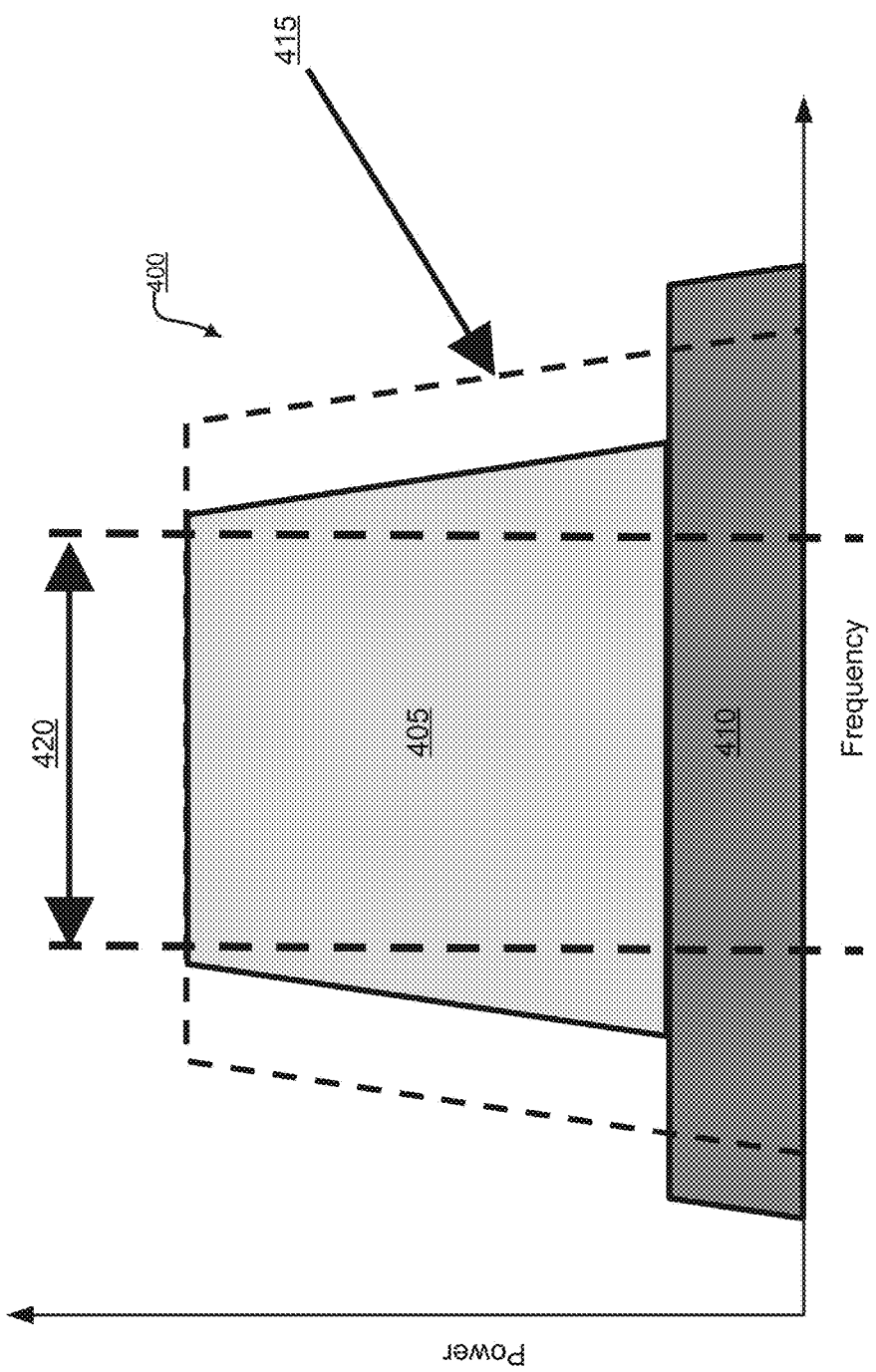
FIG. 4A illustrates a schematic diagram of a spectra of an optical signal measured across a middle portion of the spectrum in accordance with the disclosure.

If the ASE spectrum and the receiver response are wider than the signal, the ASE contribution to the total signal power may be overestimated in some aspects. FIGS. 4A and 4B illustrate schematic diagrams of spectra of an optical signal 400. The optical signal 400 may include a signal component 405 and an ASE component 410. As shown in FIGS. 4A and 4B, the spectrum of the ASE component 410 and the receiver response 415 are wider than that of the signal component 405.

In FIG. 4A, the middle portion 420 of the spectrum of the optical signal 400 may be used to measure the total signal power by calculating the variance of the digital signal in that spectral range. The total power may be obtained because the signal spectrum is known. In FIG. 4B, a smaller portion 320 of the spectrum of the optical signal 400 may be used to measure the total power by calculating variance of the digital signal in that spectral range. These calculations and measurements may be facilitated using filters 330 of FIG. 3.

Figure 5:
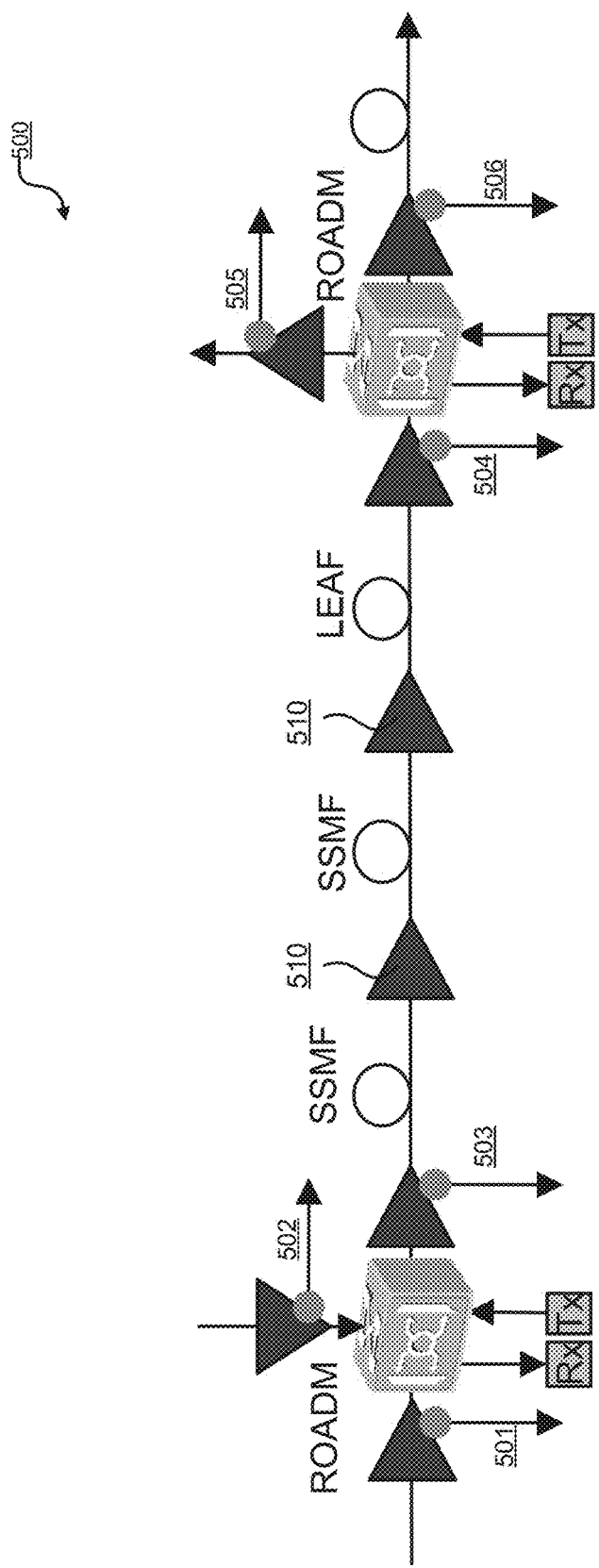
FIG. 5 illustrates a block diagram of an optical communication network in accordance with the disclosure.

Although shown and described in FIG. 3 as being implemented at the coherent receiver, it is contemplated that OSNR monitoring as described herein may be implemented at any point in the optical communication network. FIG. 5 illustrates a block diagram of an optical communication network 500 in accordance with the disclosure. The optical communication network 500 may include reconfigurable optical add-drop multiplexers (ROADMs), standard single mode fibers (SSMFs), and a large effective area fiber (LEAF). The optical communication network 500 may further include receivers (Rx) and transmitters (Tx). The optical communication network 500 may further include a plurality of optical amplifiers 510. As shown in FIG. 5, OSNR monitoring may be implemented in the optical communication network 500 at any point, including points 501-506, 510, etc.

Figure 6:
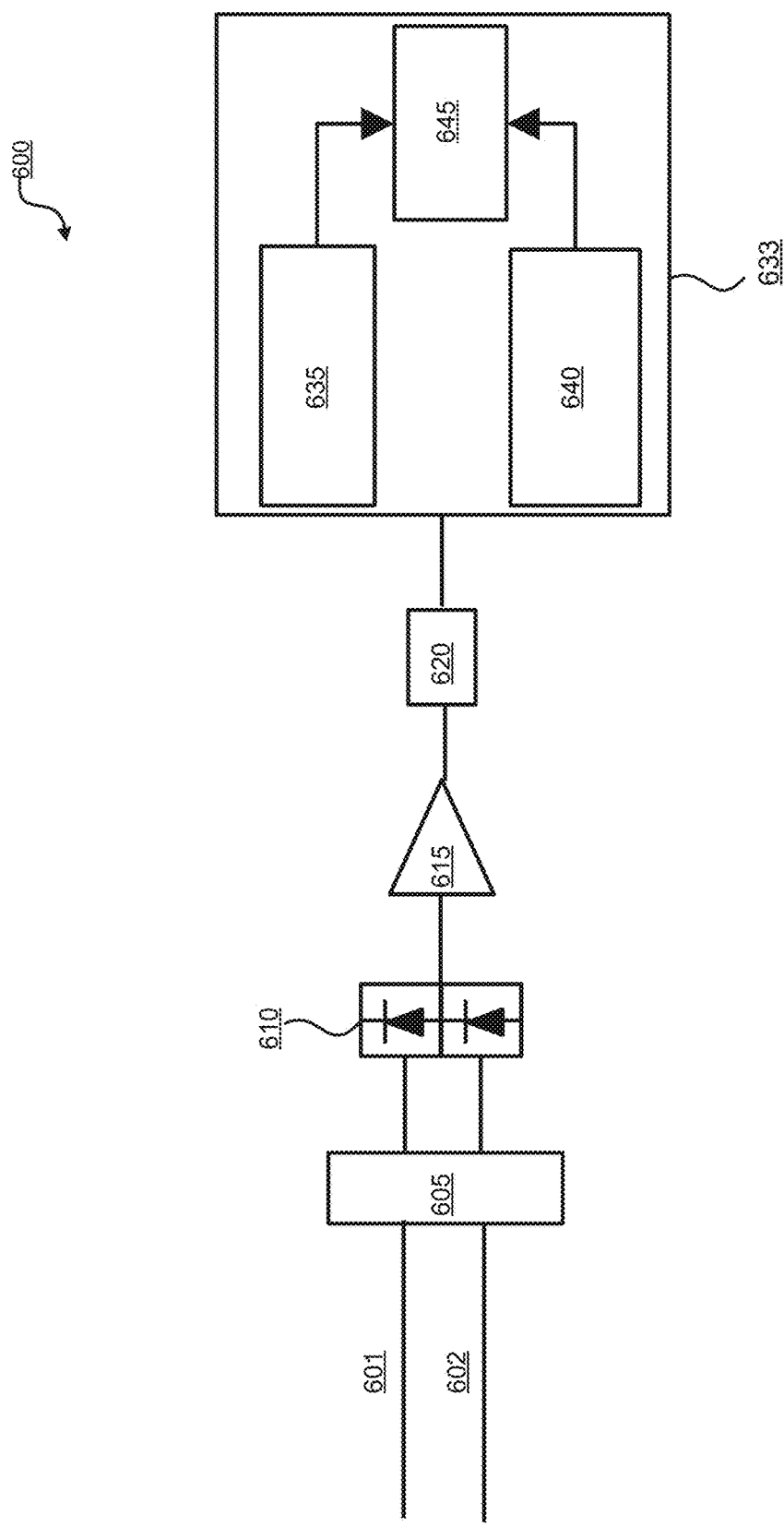
FIG. 6 illustrates a schematic diagram of a system for single polarization optical signal-to-noise ratio monitoring in accordance with the disclosure.
Figure 7:
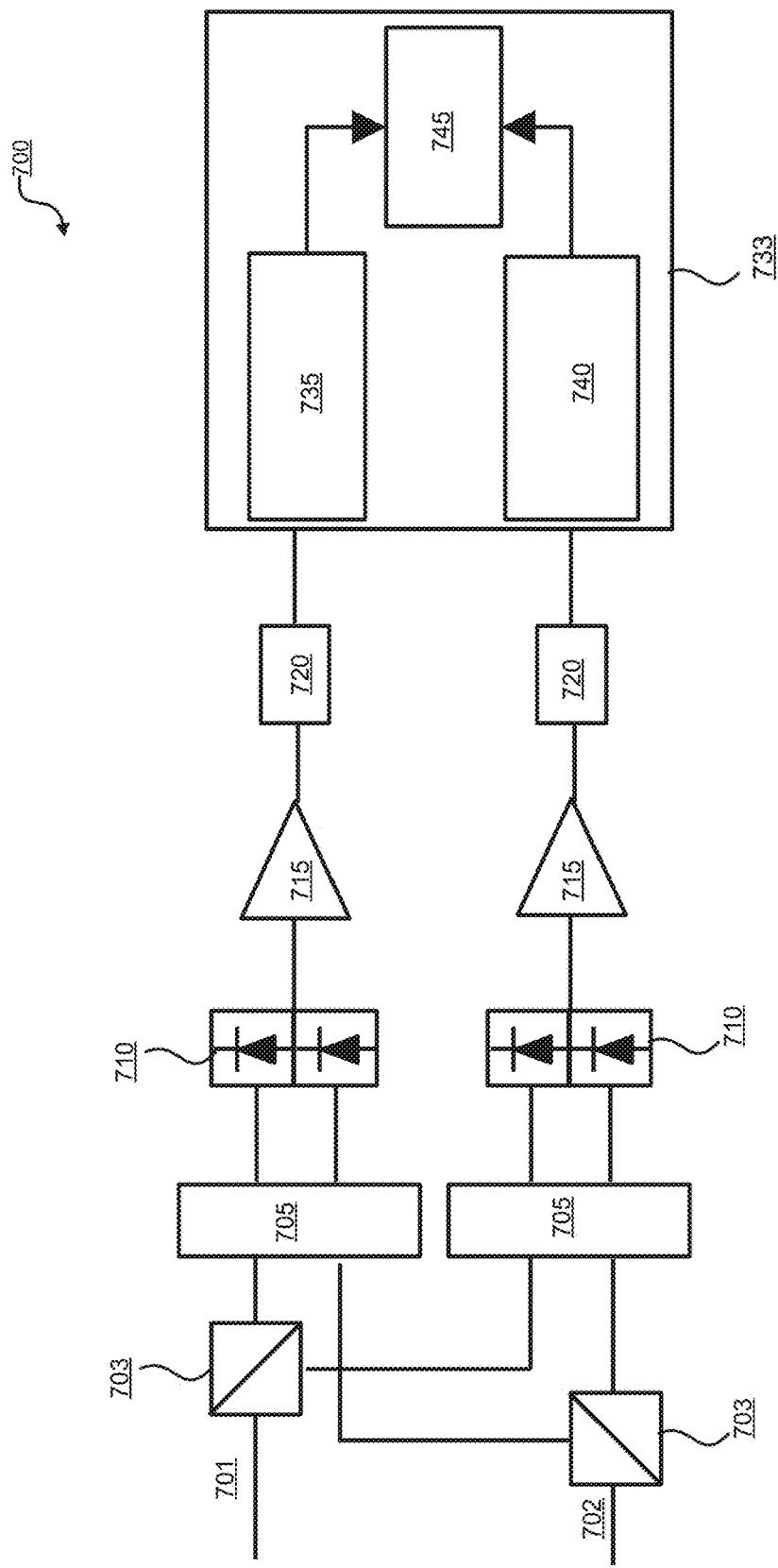
FIG. 7 illustrates a schematic diagram of a system for dual polarization optical signal-to-noise ratio monitoring in accordance with the disclosure.

In order to implement OSNR monitoring according to the disclosure at points 501-506 (i.e., outside of the coherent receiver), the systems of FIG. 6 or FIG. 7 may be used, depending on whether single polarization detection or dual polarization detection is desired. The embodiments shown in FIGS. 6 and 7 differ from that shown in FIG. 3 in that a portion of the OSNR monitoring system in FIG. 3 is implemented as part of a coherent receiver.

FIG. 6 illustrates a schematic diagram of a system 600 for single polarization OSNR monitoring in accordance with the disclosure. System 600 receives an optical signal 601. The optical signal 601 may be modulated with pilot tone. System 600 further receives a tunable local oscillator (LO) signal 602. The wavelength of the LO signal 602 determines the measured channel.

The optical signal 601 may be coupled with the LO signal 602 in coupler 605, and detected by photodiodes 610. The signal may be amplified by power amplifier 615. Power amplifier 615 may be, for example, a TIA. The amplified signal may be converted into a digital signal by analog-to-digital converter (ADC) 620.

OSNR may be calculated for the digital signal at a processor 633 applying the algorithms described with respect to FIG. 2. Specifically, variance calculation engine 635 may be configured to detect the total power of the digital signal and calculate the variance of the digital signal. Pilot tone detection engine 640 may be configured to detect the pilot tone power of the signal in order to derive the pure signal power. The OSNR calculation engine 645 may be configured to calculate the ASE power using the variance of the digital signal and the pure signal power. The OSNR calculation engine 645 may further be configured to calculate the OSNR using the total power of the digital signal and the ASE power.

FIG. 7 illustrates a schematic diagram of a system 700 for dual polarization OSNR monitoring in accordance with the disclosure. System 700 receives an optical signal 701. The optical signal 701 may be modulated with pilot tone. System 700 further receives a tunable local oscillator (LO) signal 702. The wavelength of the LO signal 702 may determine the measured channel. Similar to a typical dual polarization coherent detection receiver, polarization beam splitters 703 are used to split the signal and LO into orthogonal polarizations.

The optical signal 701 may be coupled with the LO signal 702 in couplers 705, and detected by photodiodes 710. The signal may be amplified by power amplifiers 715. Power amplifiers 715 may be, for example, TIAs. The amplified signals may be converted into digital signals by analog-to-digital converters (ADCs) 720.

OSNR may be calculated for the digital signal at a processor 733 applying the methods described with respect to FIG. 2. Specifically, variance calculation engine 735 may be configured to detect a variance value of the electrical field of the digital signals. Pilot tone detection engine 740 may be configured to detect the pilot tone power of the signals in order to derive the pure signal power. The OSNR calculation engine 745 may be configured to calculate the ASE power using the variance value and the pure signal power. The OSNR calculation engine 745 may further be configured to calculate the OSNR using the total power of the digital signals and the ASE power.

Figure 8:
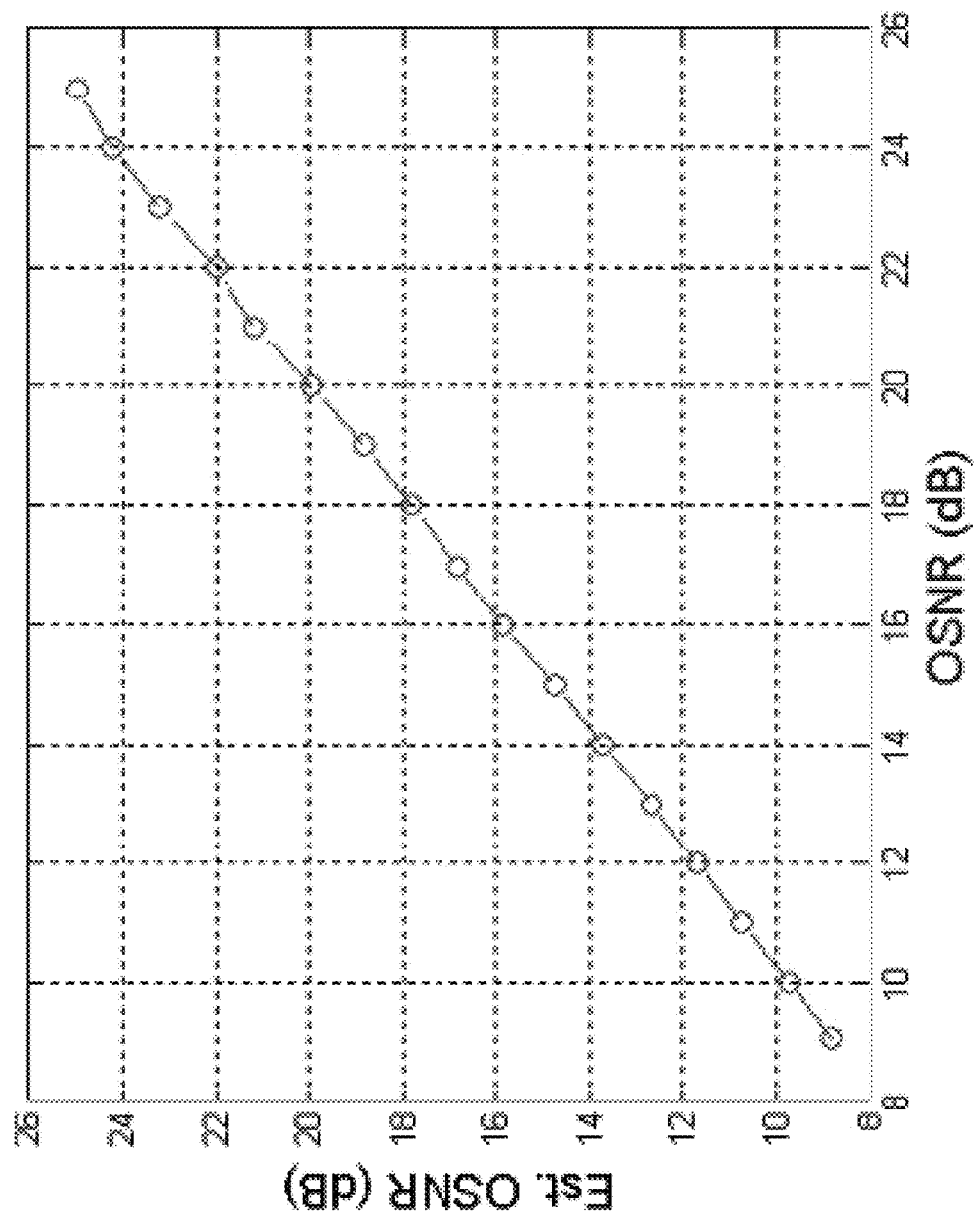
FIG. 8 illustrates a graph of measured optical signal-to-noise ratio in accordance with the disclosure as compared to other methods.

FIG. 8 illustrates a graph of measured optical signal-to-noise ratio in accordance with the disclosure as compared to another method. The OSNR estimated by the other method is illustrated along the x axis. The OSNR estimated in accordance with the disclosure is illustrated along the y axis. As can be seen from FIG. 8, the OSNR estimated in accordance with the disclosure is accurate as compared to the OSNR measured by other methods.

Figure 9:
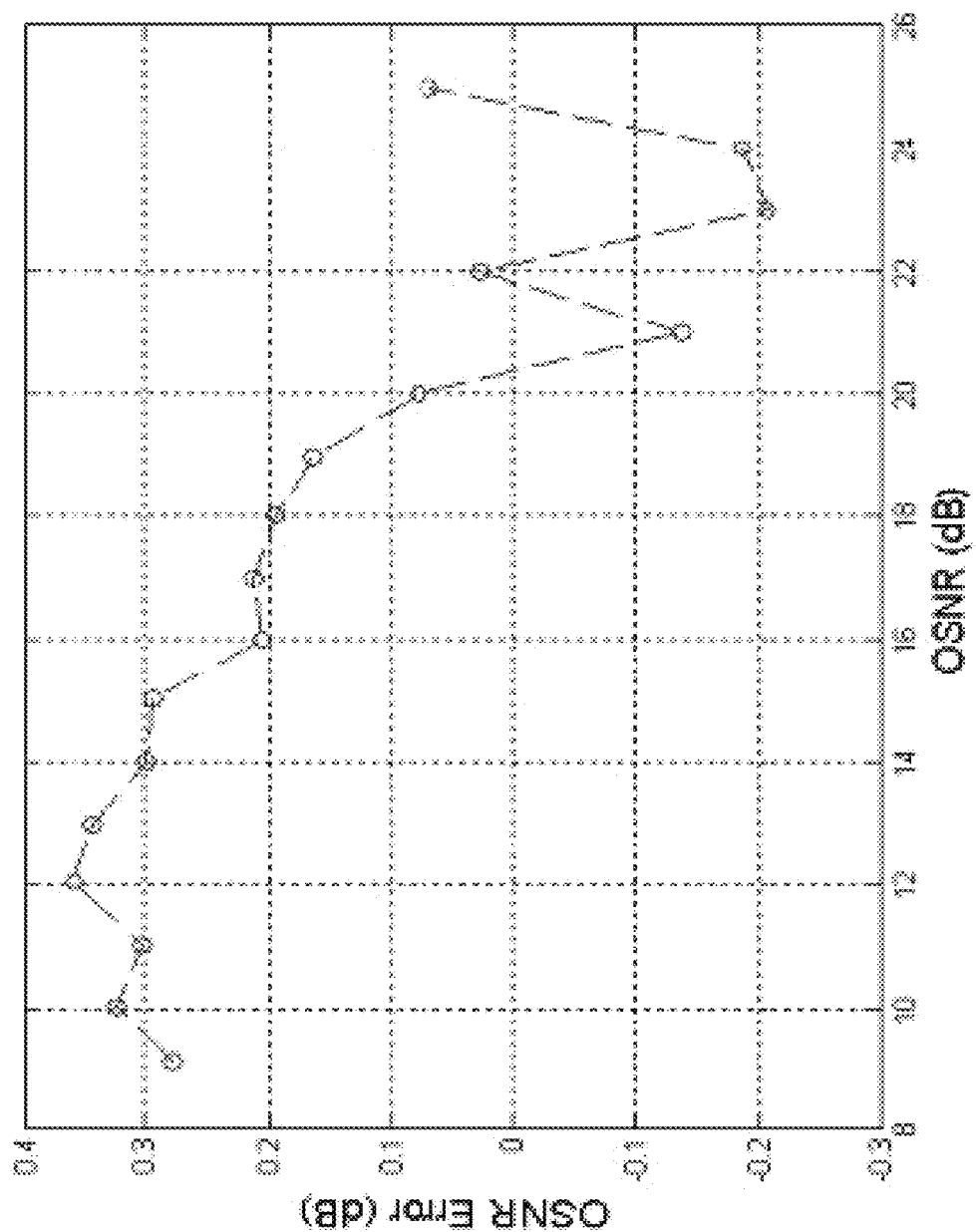
FIG. 9 illustrates a graph of error in the estimated optical signal-to-noise ratio in accordance with the disclosure.

FIG. 9 illustrates a graph of error in the estimated optical signal-to-noise ratio in accordance with the disclosure. The OSNR estimated in accordance with the disclosure is illustrated along the x axis. The amount of OSNR error is illustrated alone they axis. As can be seen from FIG. 9, the amount of OSNR error for the OSNR estimated in accordance with the disclosure is very small, ranging from −0.2 dB to 0.35 dB.

Figure 10:
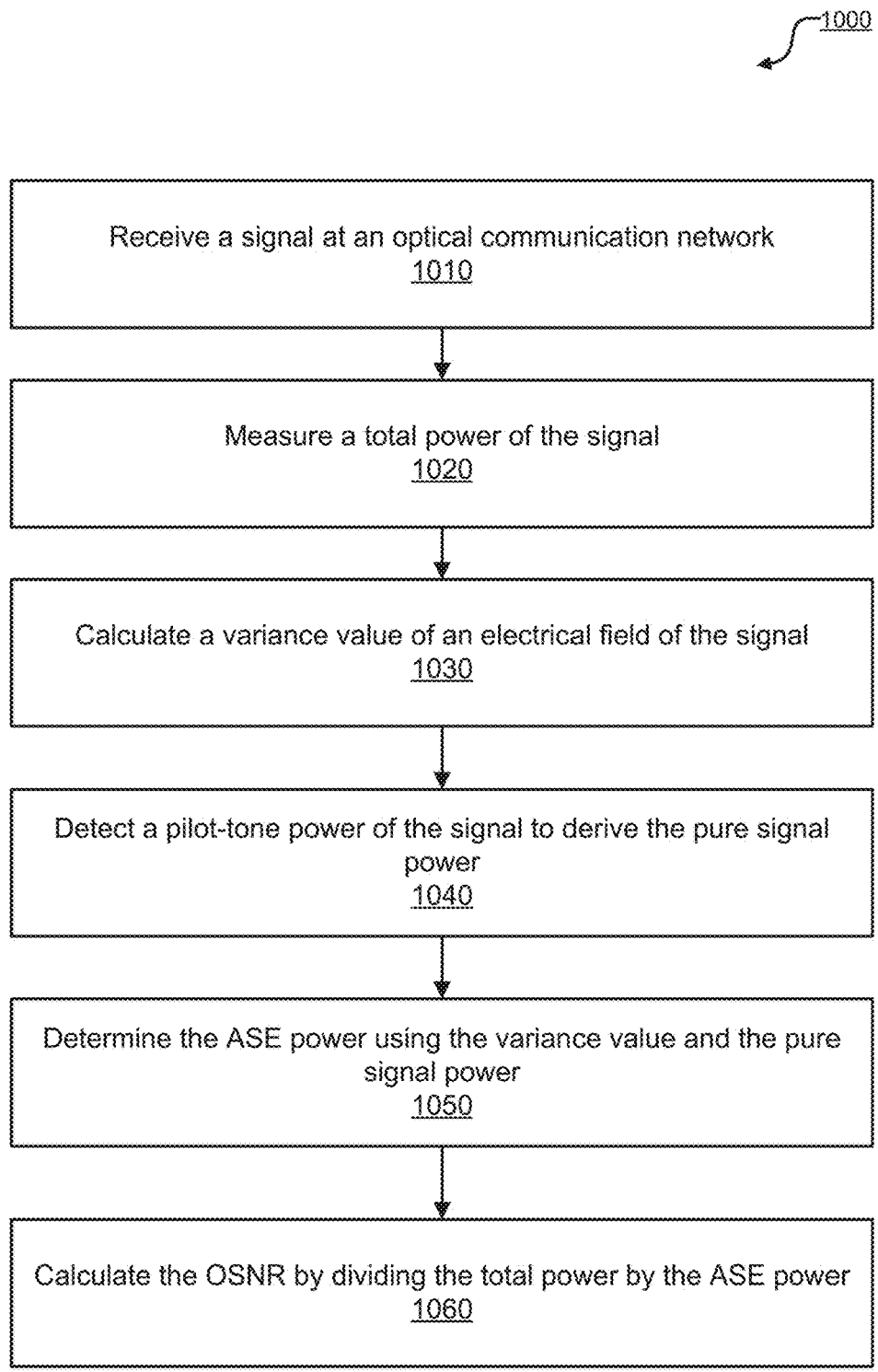
FIG. 10 illustrates a flowchart of a method for optical signal-to-noise ratio monitoring in accordance with the disclosure.

FIG. 10 illustrates a flowchart 1000 of a method for monitoring OSNR in an optical communication network in accordance with the disclosure. The flowchart 1000 may be implemented by, for example, as described above with respect to FIG. 2. The method comprises receiving a signal at the optical communication network at step 1010. The signal may be modulated with pilot tone. The signal may have single polarization or dual polarization. In some embodiments, the signal may be received at a coherent receiver of the optical communication network. In some embodiments, before the signal is received, the signal may be mixed with a local oscillator (LO) signal, an analog signal may be generated from the mixed signal using a photodiode, the analog signal may be amplified, and the analog signal may be converted into a digital signal.

In some embodiments, accumulated chromatic dispersion may be reduced or removed from the signal. In some embodiments, the signal may be filtered by a filter having a particular bandwidth. The signal may be filtered to detect a signal-to-ASE ratio at the bandwidth.

The method further comprises measuring a total power of the signal at step 1020. The total power of the signal includes a pure signal power and an amplified spontaneous emission (ASE) power. The method further comprises calculating the variance value of the signal at step 1030. If the signal is filtered at step 1010, the variance value may be calculated within the bandwidth of the filter. In some embodiments, the variance value may be calculated over a portion of the frequency spectrum of the signal.

The method further comprises detecting a pilot tone power of the signal to derive the pure signal power at step 1040. The method further comprises determining the ASE power using the variance value and the pure signal power at step 1050. The method further comprises calculating the OSNR by dividing the total power by the ASE power in 0.1 nm bandwidth according to the OSNR definition at step 1060.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined encoder-decoder (CODEC).

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method of monitoring optical signal-to-noise ratio (OSNR) in an optical communication network in an online manner, the method comprising:
   receiving an optical signal at the optical communication network, wherein the signal is modulated with pilot tone;
   measuring a total signal power of the signal, wherein the total signal power includes a pure signal power and an amplified spontaneous emission (ASE) power;
   calculating a variance value of an electrical field of the signal;
   detecting a pilot tone power of the signal to derive the pure signal power;
   calculating the ASE power using the variance value and the pure signal power; and
   calculating the OSNR by dividing the total signal power by the ASE power in 0.1 nm bandwidth.

2. The method of claim 1, wherein the signal is received at a coherent receiver.

3. The method of claim 1, further comprising:
   splitting the signal with at least one polarization beam splitter.

4. The method of claim 3, further comprising:
   mixing the split signal with a local oscillator signal.

5. The method of claim 4, further comprising:
   generating an analog signal from the mixed signal using a photodiode;
   amplifying the analog signal; and
   converting the analog signal into a digital signal.

6. The method of claim 1, further comprising:
   reducing accumulated chromatic dispersion from the signal.

7. The method of claim 1, further comprising:
   filtering the signal using a filter, wherein the filter has a filter bandwidth.

8. The method of claim 7, wherein the signal is filtered to detect a signal-to-ASE ratio at the filter bandwidth.

9. The method of claim 7, wherein the variance value is calculated within the filter bandwidth.

10. The method of claim 1, wherein the variance value is calculated over a portion of a frequency spectrum of the signal.

11. A system for monitoring optical signal-to-noise ratio (OSNR) in an optical communication network, the system comprising:

a processor; and a memory coupled to the processor, the memory storing instructions, which when executed by the processor, cause the system to perform operations including:

receiving a signal at the optical communication network, wherein the signal is modulated with pilot tone;

measuring a total signal power of the signal, wherein the total signal power includes a pure signal power and an amplified spontaneous emission (ASE) power;

calculating a variance value of an electrical field of the signal;

detecting a pilot tone power of the signal to derive the pure signal power;

calculating the ASE power using the variance value and the pure signal power; and calculating the OSNR by dividing the total signal power by the ASE power in 0.1 nm bandwidth.

12. The system of claim 11, wherein the signal is received at a coherent receiver.

13. The system of claim 11, further comprising:

at least one polarization beam splitter configured to split the signal.

14. The system of claim 13, further comprising:

a mixer configured to mix the split signal with a local oscillator signal.

15. The system of claim 14, further comprising:

a photodiode configured to generate an analog signal from the mixed signal;

a power amplifier configured to amplify the analog signal; and an analog-to-digital converter configured to convert the analog signal into a digital signal.

16. The system of claim 11, further comprising:

circuitry configured to reduce accumulated chromatic dispersion from the signal.

17. The system of claim 11, further comprising:

a filter configured to filter the signal, wherein the filter has a filter bandwidth.

18. The system of claim 17, wherein the signal is filtered to detect a signal-to-ASE ratio at the filter bandwidth.

19. The system of claim 17, wherein the variance value is calculated within the filter bandwidth.

20. The system of claim 11, wherein the variance value is calculated over a portion of a frequency spectrum of the signal.

* * * * *